United States Patent [19]

Ogino

[11] Patent Number: 5,921,828
[45] Date of Patent: Jul. 13, 1999

[54] MARINE DRIVE TRANSMISSION

[75] Inventor: Hiroshi Ogino, Shizuoka, Japan

[73] Assignee: Sanshin Kogyo Kabushiki Kaisha, Japan

[21] Appl. No.: 08/856,103

[22] Filed: May 13, 1997

[30] Foreign Application Priority Data

May 13, 1996 [JP] Japan .................................... 8-141194

[51] Int. Cl.⁶ ................................................. B60R 41/00
[52] U.S. Cl. ........................ 440/86; 416/129 A; 192/48.7
[58] Field of Search ................... 440/75, 86, 80, 440/81; 416/128, 129 R, 129 A; 192/48.7, 21, 51; 74/378

[56] References Cited

U.S. PATENT DOCUMENTS

| | | | |
|---|---|---|---|
| 3,148,557 | 9/1964 | Shimanckas | 74/378 |
| 4,570,776 | 2/1986 | Iwashita et al. | 192/114 R |
| 4,689,027 | 8/1987 | Harada et al. | 440/79 |
| 4,793,773 | 12/1988 | Kinouchi et al. | 416/129 A |
| 4,957,460 | 9/1990 | Harada et al. | 440/75 |
| 5,006,084 | 4/1991 | Handa | 440/75 |
| 5,449,306 | 9/1995 | Nakayasu et al. | 440/75 |
| 5,520,559 | 5/1996 | Nakayasu et al. | 440/75 |
| 5,575,698 | 11/1996 | Ogino | 440/75 |
| 5,597,334 | 1/1997 | Ogino | 440/75 |

FOREIGN PATENT DOCUMENTS

| | | |
|---|---|---|
| 64-28093 | 1/1989 | Japan . |
| 1-105041 | 4/1989 | Japan . |
| 1-309890 | 12/1989 | Japan . |

*Primary Examiner*—Jesus D. Sotelo
*Attorney, Agent, or Firm*—Knobbe, Martens, Olson & Bear, LLP

[57] ABSTRACT

A transmission arrangement reduces internal stresses and friction within a coupling that links a shift operator with a counter-rotating clutch element of a dual clutch assembly. The shift operator, which interconnects the dual clutches, includes a gap in the connection between the clutches to interject a small degree of play between the clutch elements. The resulting clearance compensates for any adverse tolerance stack-ups which otherwise would produce significant friction between the coupling and the counter-rotating clutch element. The degree of play within the assembly, however, is not so large as to affect the smoothness of the transmission when shifting.

25 Claims, 5 Drawing Sheets

MARINE DRIVE TRANSMISSION

BACKGROUND OF THE INVENTION

1. Field of the Invention

The present invention relates to a marine drive, and in particular to a transmission for a marine drive.

2. Description of the Related Art

Many watercraft employ outboard motors that are mounted on the transom of the watercraft. An outboard motor generally includes a power head that houses an engine, a drive shaft housing situated below the power head, and a lower unit that is positioned below the drive shaft housing. The lower unit typically houses a transmission and a propulsion shaft that drives a propulsion device.

Some outboard motors employ counter-rotating propeller systems which utilize a pair of counter-rotating propellers which operate in series about a common rotational axis. By using propeller blades having a pitch of opposite hand, the dual propeller arrangement provides significant improvement in propulsion efficiency.

Some outboard motors now employ forward/neutral/reverse transmissions together with the dual counter-rotating propeller system. These transmissions typically include a driving bevel gear and a pair of oppositely rotating driven bevel gears. Each driven gear includes a hub that is journalled within a lower unit of the outboard motor. A front dog clutch of a dual clutch assembly is positioned on a front side of the front driven gear hub. The front clutch selectively engages corresponding teeth formed on the front side of the hub of the front gear to drive an inner propeller shaft. The inner propulsion shaft in turn drives a rear propeller.

The rear dog clutch of the clutch assembly is interposed between the pair of oppositely rotating gears. In this position, the rear dog clutch moves between positions in which the clutch engages one of the gears. In this manner, the rear dog clutch selectively couples an outer propeller shaft to one of the driven gears to rotate a front propeller in either a forward or a reverse direction.

An actuator moves the clutches in to and out of engagement with the driven gears. The clutches desirably move in unison and for that matter a shift operator interconnects the clutches. In one prior transmission, the shift operator is formed by a plunger rod that is coupled to each clutch by a connecting pin. The front connecting pin directly connects the front clutch to the plunger such that the plunger and the front clutch rotate together. The plunger, however, is not so directly connected to the rear clutch. A coupling connects the plunger to the rear clutch in a manner that allows the rear clutch to rotate in a counter direction from the rotational direction of the plunger.

The coupling in some prior transmissions includes an annular bushing that is captured within a counterbore of the rear clutch. The annular bushing is supported therein to permit the annular bushing to rotate in an opposite direction from that of the counter-rotating rear dog clutch. The ends of the pin are embedded within the annular bushing with the annular bushing interposed between a pair of washers within the counterbore. The axial movement of the plunger moves the pin and the annular bushing, and thus the rear dog clutch.

SUMMARY OF THE INVENTION

The present invention involves the recognition that tolerance stack-ups within the assembled transmission often place great stress and friction within the coupling that links the plunger to the counter-rotating clutch element. The tolerances present within the manufactured component parts themselves, as well as position tolerances occurring in the assembled transmission, contribute to this stack-up. As a result, when the counter-rotating clutch element is actuated into an engaged position with one of the driven gears, the connecting pin forces the annular bushing against the opposite rotating washer, which rotate with the clutch, thereby creating significant friction between the bushing and the washer (and/or the clutch body). This frictional contact wears the bushing and the washer (and/or the clutch body) and lessens the life of the transmission. A need therefore exists for a transmission arrangement that significantly reduces the friction between the counter-rotating clutch and its operator coupling in order to extend the life of the transmission.

Another aspect of the invention thus involves the further recognition that the friction within the clutch elements can be reduced by interjecting a small degree of play between the clutch elements, but not so much play as to noticeably affect the smoothness of the transmission's shifting. It has been determine that a gap in the connection between the clutches greatly improves the wear life of the coupling between the plunger and the counter-rotating clutch element.

In accordance with this aspect of the present invention, a transmission for a marine drive is provided. The transmission comprises a first driven gear and a corresponding first clutch element that is coupled to a first propulsion shaft. A shift operator is coupled to the clutch by a coupling. The coupling includes an annular bushing that is journalled for rotation within a bore of the clutch element. A pin links the shift operator to the annular bushing and is arranged within the transmission such that a clearance space exists between the pin and the shift operator. The desired clearance thus occurs between the shift operator and the pin.

In accordance with another aspect of the invention, the transmission comprises first and second counter-rotating gears. A first clutch element is coupled to a first propulsion shaft and is adapted to selectively engage either of the first or second gears to establish at least a first or a second drive condition. A second clutch element is coupled to a second propulsion shaft and is adapted to selectively engage the second gear under one of said drive conditions. A shift operator couples together the clutch elements and moves the clutch elements so as to engage and disengage the clutch elements from the first and second gears. A clearance gap is formed with the clutch assembly to provide a degree of play between the clutches. The clearance gap reduces the frictional contact between the clutch element and the inner member while still providing for smooth shifting of the transmission.

Further aspects, features, and advantages of the present invention will become apparent from the detailed description of the preferred embodiment which follows.

BRIEF DESCRIPTION OF THE DRAWINGS

The above-mentioned and other features of the invention will now be described with reference to the drawings of a preferred embodiment of the present marine transmission. The illustrated embodiments of the marine transmission are intended to illustrate, but not to limit the invention. The drawings contain the following figures.

DETAILED DESCRIPTION OF A PREFERRED EMBODIMENT OF THE INVENTION

Figure 1:
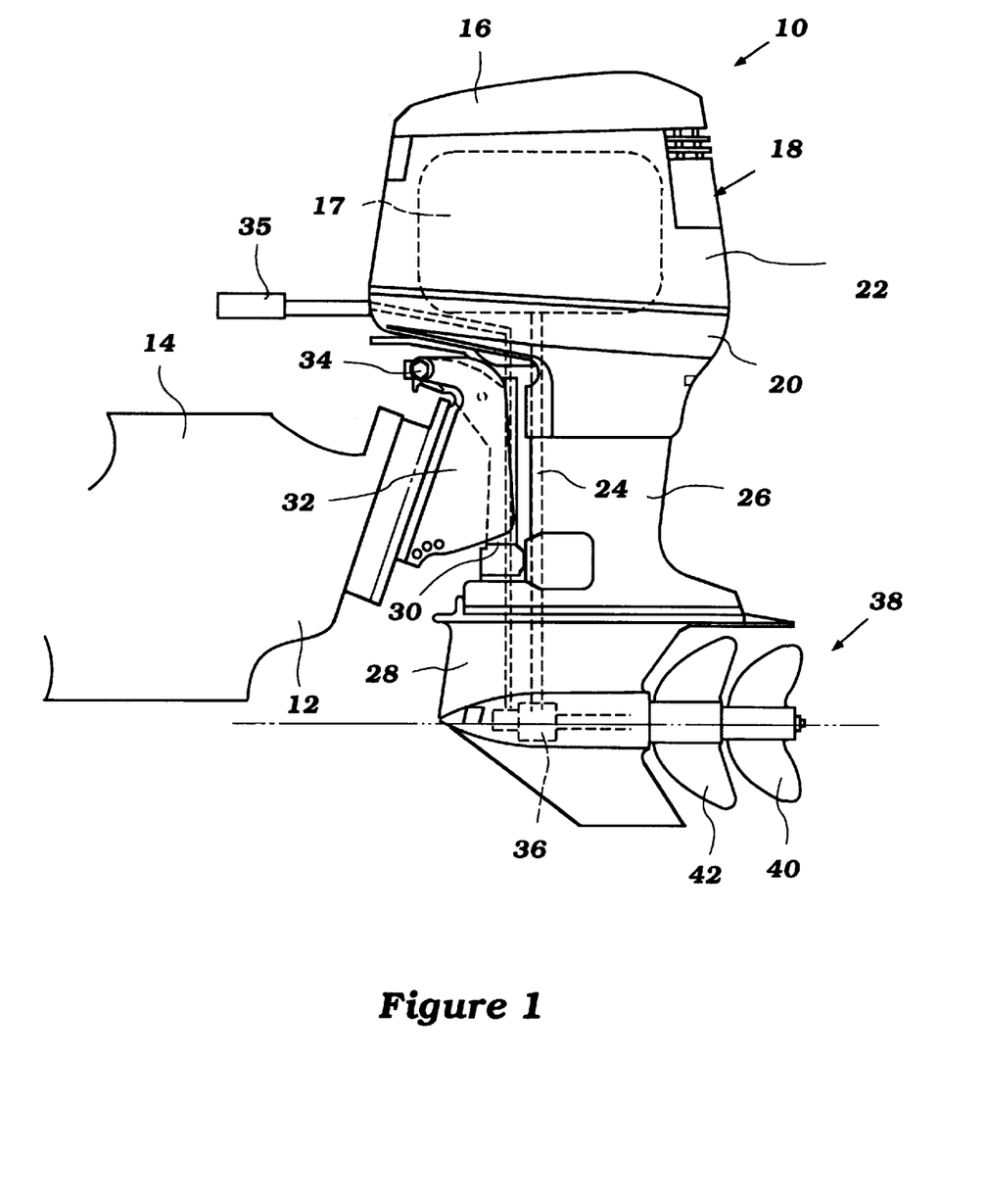
FIG. 1 is a side elevational view of an outboard motor which incorporates a transmission that is configured in accordance with a preferred embodiment of the present invention.

FIG. 1 illustrates a marine drive 10 configured in accordance with a preferred embodiment of the present invention. In the illustrated embodiment, the marine drive 10 is depicted as an outboard motor for mounting on a transom 12 of the watercraft 14. It is contemplated, however, that those skilled in the art will readily appreciate that the present invention can be applied to stem drive units of inboard/outboard motors, and to other types of watercraft drive units, as well. Thus, as used herein, "marine drive" generically means an outboard motor, an inboard/outboard motor including a stem drive, and similar marine drive units. Additionally, "front" and "rear" are used herein in reference, to the transom 12 of the watercraft 14.

In the illustrated embodiment, the outboard drive 10 has a power head 16 which includes an engine 17. A conventional cowling 18 desirably includes a lower tray 20 and a top cowling member 22. These components 20, 22 of the protective cowling 18 together define an engine compartment which houses the engine 17.

The engine 17 is mounted conventionally with its outward shaft (i.e., a crankshaft) rotating about a generally vertical axis. The crankshaft (not shown) drives a drive shaft 24 (FIG. 2), as known in the art. The drive shaft 24 depends from the power head 16 of the outboard drive 10.

Figure 2:
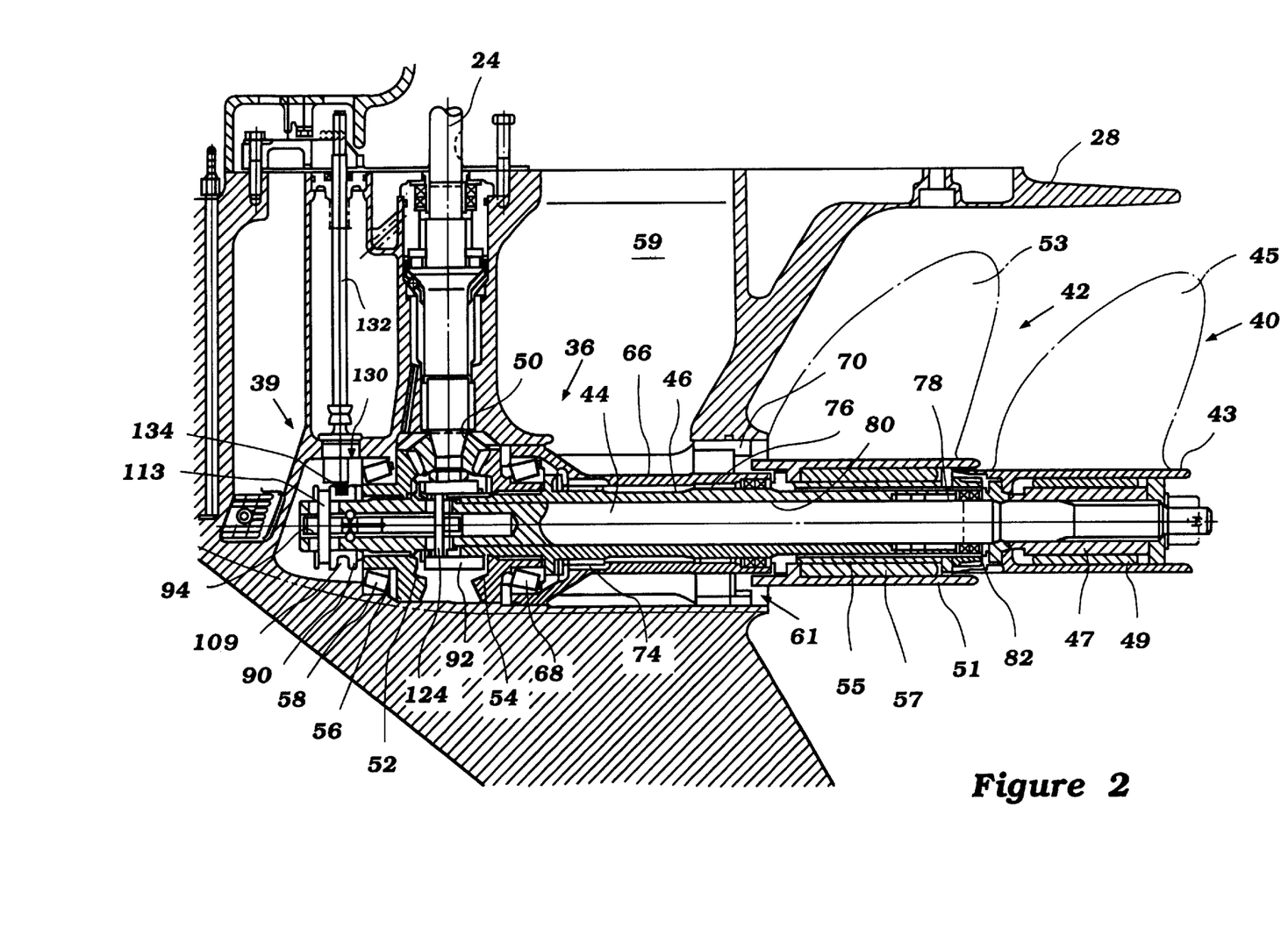
FIG. 2 is a sectional, side elevational view of a lower unit and the transmission of the outboard motor of FIG. 1.

A drive shaft housing 26 extends downward from the lower tray 20 and terminates in a lower unit 28. As known in the art, the drive shaft 24 extends through and is journalled within the drive shaft housing 26.

The engine 17 includes an exhaust system which discharges exhaust gases through an exhaust pipe (not shown). The exhaust depends from the engine 17, which is positioned within the cowling 18, into an exhaust expansion chamber (not shown) formed in the drive shaft housing 26.

A steering bracket 30 is attached to the drive shaft housing 26 in a known manner. The steering bracket 30 also is pivotally connected to a clamping bracket 32 by a pin 34. The clamping bracket 32, in turn, is configured to attach to the transom 12 of the watercraft 14. This conventional coupling permits the outboard drive 10 to be pivoted relative to the steering bracket 30 for steering purposes, as well as to be pivoted relative to the pin 34 to permit adjustment to the trim position of the outboard drive and for tilt up of the outboard drive 10. A steering handle 35 is attached to a steering shaft within the bracket 30 in order to rotate the outboard motor 10 about a steering axis. Although not illustrated, it is understood that a conventional hydraulic tilt and trim cylinder assembly, as well as a conventional hydraulic steering cylinder assembly could be used as well with the present outboard drive 10.

The lower unit 28 houses a transmission 36 which selectively establishes a driving condition of a propulsion device 38, such as, for example, a propeller, a hydrodynamic jet, or the like. The transmission 36 advantageously is a forward/neutral/reverse type transmission. In this manner, the propulsion device 38 can drive the watercraft in any of these three operating states.

A shift actuator 39 operates the transmission. In the illustrated embodiment, the shift actuator 39 is coupled to a user operator located on the steering handle 35. In this manner, the user can easily shift the outboard motor 10 between forward, neutral and reverse drive conditions.

The present transmission 36 is particularly well suited for use with a counter-rotational propulsion device 38. In the illustrated embodiment, the propulsion device 38 is a counter-rotational propeller device that includes a rear propeller 40 designed to spin in one direction and to assert a forward thrust, and a front propeller 42 designed to spin in an opposite direction and to assert a forward thrust.

FIG. 2 illustrates the components of the front and rear propellers 40, 42. The rear propeller 40 includes a boss 43 to which the propeller blades 45 are integrally formed.

An inner propulsion shaft 44 drives the rear propeller boss 43. For this purpose, the rear end of the inner propulsion shaft 44 carries an engagement sleeve 47 which has a spline connection with the rear end of the rear propulsion shaft 44. The sleeve 47 is fixed to the rear end of the inner shaft 44 between a nut threaded on the rear end of the shaft 44 and an annular thrust washer positioned between the front and rear propeller 40, 42. An elastic bushing 49 is interposed between the engagement sleeve 47 and the rear propeller boss 43 and is compressed therebetween. The bushing 49 is secured to the engagement sleeve 47 by a heat process known in the art. The frictional engagement between the boss 43 and the elastic bushing 49 is sufficient to transmit rotational forces from the engagement sleeve 47, driven by the inner propulsion shaft 44 to the rear propeller blades 45.

The front propeller 42 likewise includes a front propeller boss 51. Propeller blades 67 of the front propeller 42 are integrally formed on the exterior of the boss 51.

An outer propulsion shaft 46 carries the front propeller 42. As best seen in FIG. 2, the rear end portion of the outer propulsion shaft 46 carries a front engagement sleeve 55 and drives the engagement sleeve 55 thereabouts by a spline connection. The front engagement sleeve 55 is secured onto the outer propulsion shaft 46 between the annular retaining nut and a front thrust washer.

A front annular elastic bushing 57 surrounds the front engagement sleeve 55. The bushing 57 is secured to the sleeve 55 by a heat process known in the art.

The front propeller boss 51 surrounds the elastic bushing 57, which is held under pressure between the boss 51 and the engagement sleeve 55 in frictional engagement. The frictional engagement between the propeller boss 51 and the bushing 57 is sufficient to transmit a rotational force from the sleeve 55 to the propeller blades 53 of the front propeller boss 51.

As also seen in FIG. 2, the drive shaft housing 26 and the lower unit 28 together define an exhaust discharge duct 59 which delivers engine exhaust from the expansion chamber of the drive shaft housing 26 to an outlet end 61. The outlet end 61 of the exhaust discharge passage 59 is located in front of the propulsion device 38.

The individual components of the present transmission 36 will now be described in detail with reference to FIGS. 2 and 3.

Figure 3:
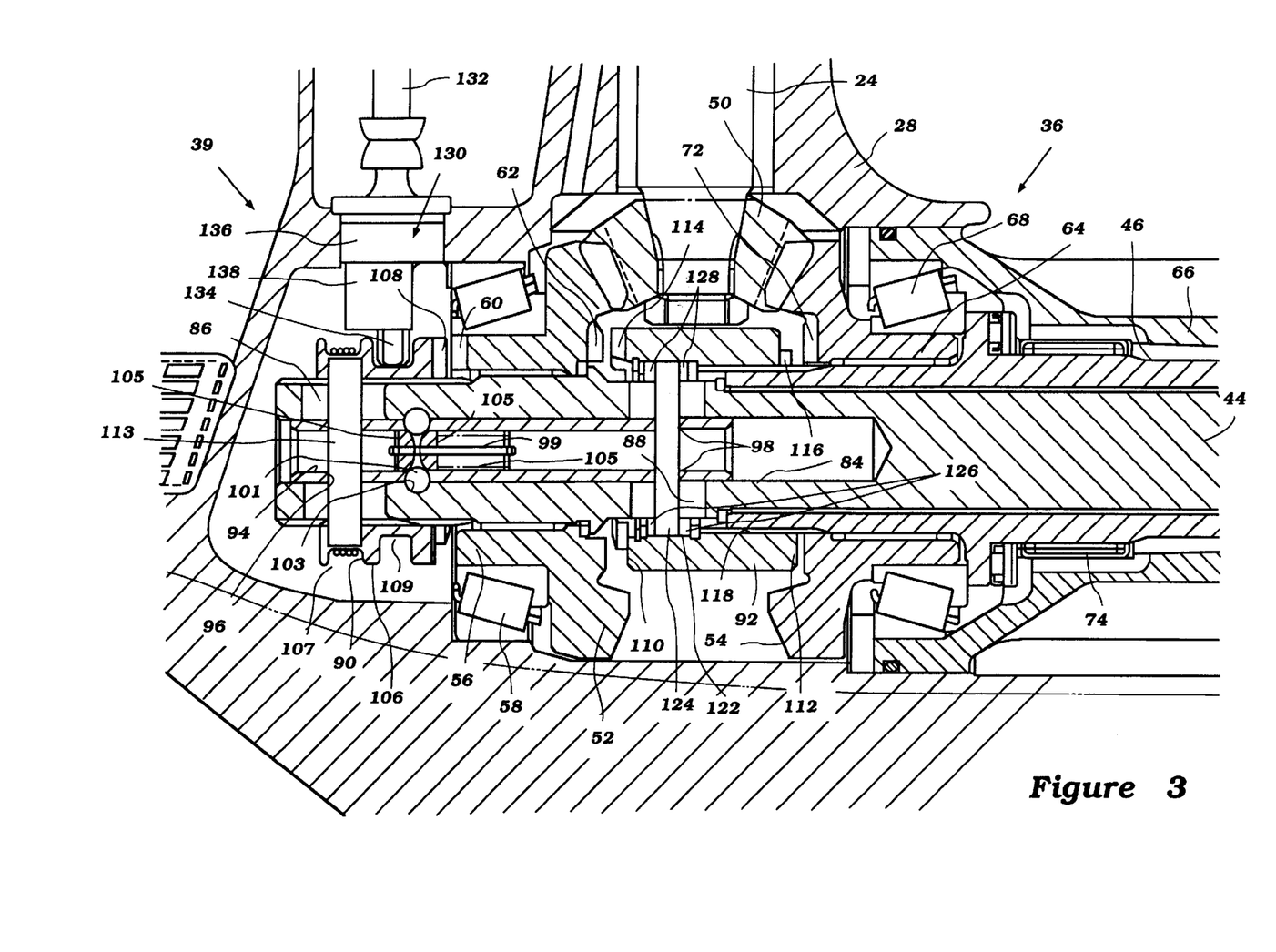
FIG. 3 is an enlarged, sectional side view of the transmission of FIG. 2.

With reference to FIG. 3, the drive shaft 24 carries a drive gear 50 at its lower end, which is disposed within the lower unit 28 and which forms a portion of the transmission 36. The drive gear 50 preferably is a bevel type gear.

The transmission 36 also includes a pair of counter-rotating driven gears 52, 54 that are in mesh engagement with the drive gear 50. The pair of driven gears 52, 54 preferably are positioned on diametrically opposite sides of the drive gear 50, and are suitably journalled within the lower unit 28 as described below. Each driven gear 52, 54 is positioned at about a 90 degree shaft angle with the drive shaft 24. That is, the propulsion shafts 44, 46 and the drive shaft 24 desirably intersect at about a 90 degree shaft angle; however, it is contemplated that the drive shaft 24 and the propulsion shaft 44, 46 can intersect at almost any angle.

In the illustrated embodiment, the pair of driven gears 52, 54 are a front bevel gear 52 and an opposing rear bevel gear 54. The front bevel gear 52 includes a hub 56 which is journalled within the lower unit 28 by front thrust bearing 58. The thrust bearing 58 rotatably supports the front gear 52 in mesh engagement with the drive gear 50.

As seen in FIG. 3, the hub 56 has a central bore 57 through which the inner propulsion shaft 44 passes when assembled. The inner propulsion shaft 44 is suitably journalled within the central bore of the front gear hub 56. The front gear 52 also includes a series of teeth 60 on an annular front facing engagement surface, and includes a series of teeth 62 on an annular rear facing engagement surface. The teeth 60, 62 on each surface positively engage a portion of a clutch element of the transmission 36, as described below.

As seen in FIG. 3, the rear gear 54 also includes a hub 64 which is suitably journalled within a bearing carrier 66 of the lower unit 28 by a rear thrust bearing 68. The rear thrust bearing 68 rotatably supports the rear gear 54 in mesh engagement with the drive gear 50. A front end ring 70 (FIG. 2), attached to the lower unit 28, secures the bearing carrier 66 to the lower unit 28.

With reference to FIGS. 3, the hub 64 of the rear gear 54 has a central bore through which the inner propulsion shaft 44 and the outer propulsion shaft 46 pass when assembled. The rear gear 54 also includes an annular front engagement surface which carries a series of teeth 72 for positive engagement with a clutch element of the transmission 36, as described below.

As best seen in FIGS. 2 and 3, the bearing carrier 66 rotatably supports the hollow outer propulsion shaft 46 within the lower unit 28. A front needle bearing 74 journals a front end of the outer propulsion shaft 46 within the bearing carrier 66. A rear needle bearing 76 supports the outer propulsion shaft within the bearing carrier 66 at an opposite end of the bearing casing 56 from the front needle bearing 74.

From the front side of the front gear 52, the inner propulsion shaft 44 extends rearward through the front gear hub 56 and the rear gear hub 64, and is suitably journalled therein. On the rear side of the rear gear 54, the inner propulsion shaft 44 extends through the outer shaft 46 and is suitably journalled therein by a rear needle bearing assembly 78 which supports the inner shaft 44 at the rear end of the outer shaft 46.

A first pair of seals 80 (e.g., oil seals) are interposed between tie bearing carrier 66 and the outer propulsion shaft 46 at the rear end of the bearing carrier 66. Likewise, a second pair of seals 82 (e.g., oil seals) are interposed between the inner shaft 44 and the outer shaft 46 at the rear end of the outer shaft 46. The seals 80, 82, which are located at the rear end of the bearing carrier 66 and at the rear end of the outer shaft 46, substantially prevent lubricant flow beyond these points.

With reference to FIG. 3, the front end of the inner propulsion shaft 44 includes a longitudinal bore 84. The bore 84 extends from the front end of the inner shaft 44 to a bottom surface which is positioned on the rear side of the axis of the drive shaft 24. A front aperture 86 extends through the inner shaft 44, transverse to the axis of the longitudinal bore 84, at a position forward of the front bevel gear 52. The inner shaft 44 also includes a rear aperture 88 that extends transverse to the axis of the longitudinal bore 84 and is generally symmetrically positioned between the front bevel gear 52 and the rear bevel gear 54.

As best seen in FIG. 3, the transmission 36 also includes a front clutch 90 and a rear clutch 92 coupled to a shift operator or plunger 94. As discussed in detail below, the front clutch 90 selectively couples the inner propulsion shaft to the front gear 52. The rear clutch 92 selectively couples the outer propulsion shaft 46 either to the front gear 52 or to the rear gear 54. FIG. 3 illustrates the front clutch 90 and the rear clutch 92 set in a neutral position (i.e., in a position in which the clutches 90, 92 do not engage either the front gear 52 or the rear gear 54). In the illustrated embodiment, the clutches 90, 92 are positive clutches, such as, for example, dog clutches.

The plunger 94 has a generally cylindrical rod shape and slides within the longitudinal bore 84 of the inner shaft 44 to actuate the clutches 90, 92. The plunger 94 may be solid; however, it is preferred that the plunger 94 be hollow (i.e., a cylindrical tube), especially where a neutral detent mechanism of the type described below is used.

The plunger 94 includes a front hole 96 that is positioned generally transverse to the longitudinal axis of the plunger 94 and a rear hole 98 that is likewise positioned generally transverse to the longitudinal axis of the plunger 94. Each hole 96, 98 desirably is located symmetrically in relation to the corresponding apertures 86, 88 of the inner propulsion shaft 44.

The transmission 36 may also include a neutral detent mechanism 99 to hold the plunger 94 (and the coupled clutches 90, 92) in the neutral position. FIG. 3 illustrates an embodiment of the neutral detent mechanism 99 used with a hollow plunger 94 in which the detent mechanism cooperates between the plunger 94 and the inner propulsion shaft 44, and is located at the front end of the inner propulsion shaft 44.

The neutral detent mechanism is formed in part by at least one, and preferably two, transversely positioned holes in the plunger 94. These holes receive detent balls 101. The detent balls each have a diameter which is slightly smaller than the diameter of each hole.

As seen in FIG. 3, the inner propulsion shaft 44 includes an annular groove 103 which is formed on the inner wall of the bore 84 through which the plunger 94 slides. The groove 103 is positioned within the bore 84 so as to properly locate the clutches 90, 92 in the neutral position when the detent holes of the plunger 94 coincide with the axial position of the annular groove 103. A spring plunger 105, formed in part by a helical compression spring, biases the detent balls 101 outwardly against the inner wall of the inner propulsion shaft bore 84. The plunger 94 contains the spring plunger 105 within its bore.

The spring plunger 105 forces portions of the detent balls 101 into the annular groove 103 when the plunger 94 is moved into the neutral position. This releasable connection between the detent balls 101 carried by the plunger 94 and the groove 103 of the inner propulsion shaft 44 releasably restrains movement of the plunger 94 relative to the inner propulsion shaft 44, as known in the art. Because the detent mechanism 99 is believed to be conventional, further description of the detent mechanism 99 is thought unnecessary for an understanding of the present transmission 36.

The front dog clutch 90 has a generally cylindrical shape that includes an axial bore 100 which extends between an annular front end 102 and a flat annular rear end 104. The bore 100 is sized to receive the inner propulsion shaft 44. Internal splines 106 are formed on the wall of the bore 100, the purpose of which will be explained below.

The rear end surface 104 of the clutch 90 extends generally transverse to the longitudinal axis of the clutch 90. The rear surface 104 of the front dog clutch 90 is substantially coextensive in area with the annular front surface of the front gear 52. Teeth 108 extend from the clutch rear surface 104 in the longitudinal direction and desirably correspond to the teeth 60 of the front surface of the front gear 52 in size (e.g., axial length) in number and in configuration.

A pair of annular grooves circumscribe the exterior of the front clutch 90. A front groove 107 is sized to receive a retaining spring, as discussed below. The rear groove 109 is sized to cooperate with a portion of an actuator mechanism, which also will be described below.

The front clutch 90 includes a transverse hole that extends through the clutch 90 at the location of the front annular groove 107. The hole is sized to receive a pin 113 which, when passed through the front aperture 86 of the inner propulsion shaft 44 and through the front hole 96 of the plunger 94, interconnects the plunger 94 and the front clutch 90 with the front clutch 90 positioned on the inner propulsion shaft 44. The pin 113 may be held in place by a press-fit connection between the pin 113 and the front hole of the clutch 90 or by a conventional coil spring 115 which is contained within the front annular groove 107 about the exterior of the front clutch 90.

The rear clutch 92 is disposed between the two counter-rotating driven gears 52, 54. The rear dog clutch 92 has a tubular shape that includes an axial bore which extends between an annular front end 110 and an annular rear end 112. The bore is sized to receive a portion of the outer propulsion shaft 46 positioned about the inner propulsion shaft 44.

The annular end surfaces 110, 112 of the rear clutch 92 are substantially coextensive in size with the annular engagement surfaces of the front and rear gears 52, 54, respectively. Teeth 114 extend from the front end 110 of the rear clutch 92 and desirably correspond to the respective teeth 62 of the front gear 52 in size (e.g., axial length), in number, and in configuration. Teeth 116 likewise extend from the rear end surface 112 of the rear clutch 92 and desirably correspond to the respective teeth 72 of the rear gear 54 in size (e.g., axial length), in number, and in configuration.

Figure 4:
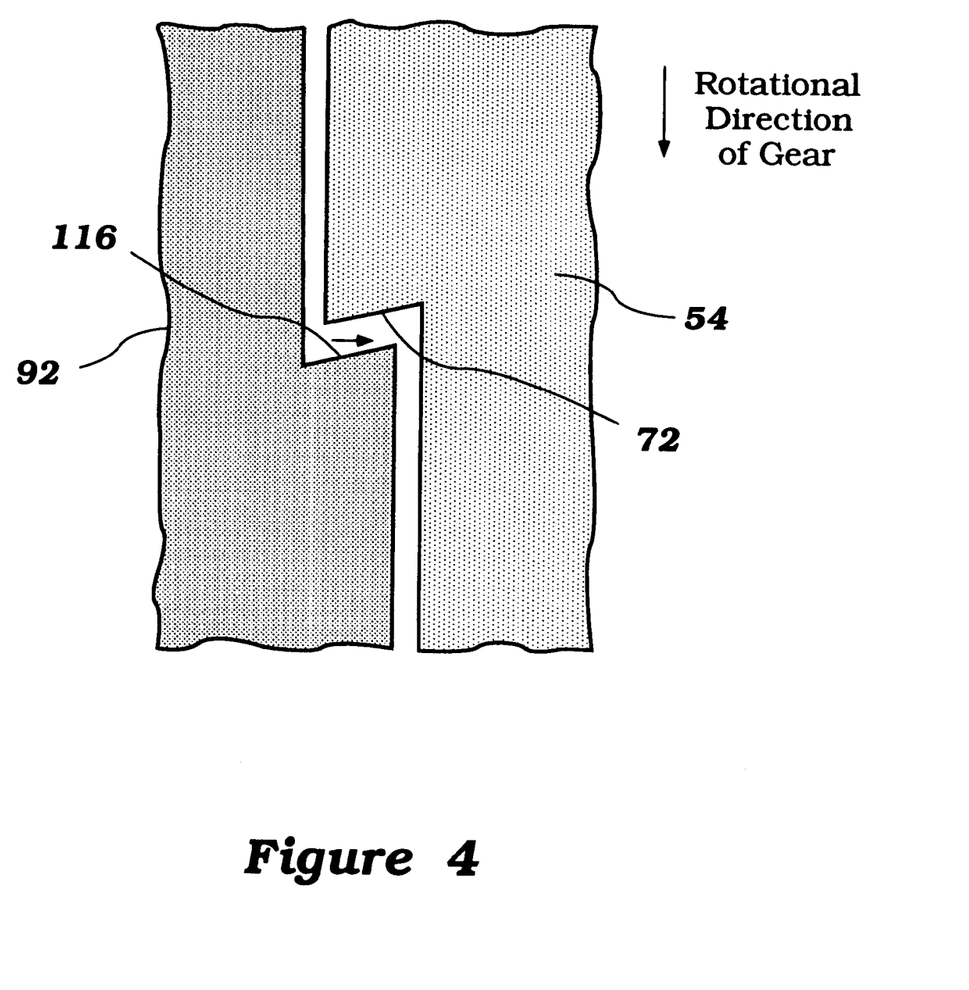
FIG. 4 is a schematic enlarged view of the shape of corresponding teeth of a gear and clutch element of the transmission of FIG. 3.

With reference to FIG. 4, the cooperating teeth 116, 72 between the rear clutch 92 and the rear gear 54 are formed to draw the clutch 92 toward the rear gear 54 upon initiation of engagement. The teeth 72 on the rear gear 54 are cut to slope outwardly a general direction that corresponds to a designed rotational direction of the gear 54. The teeth 116 on the clutch have a corresponding shape. As a result, as the teeth 72, 116 begin to engage, the rotational force applied to the angular shoulders produces an axial components (as schematically represented in FIG. 4) that forces the (clutch 92 toward the gear 54. It is also understood that the teeth 114 on the opposite side of the clutch 92 and the corresponding teeth 62 of the front gear 52 have similar angular shapes, but with an opposite direction of slope due to the designed counter-rotation of the front gear 52.

With reference back to FIG. 3, the rear clutch 92 is splined to the outer propulsion shaft 46. The clutch 92 thus drives the outer propulsion shaft 44 through the spline connection 118 between the rear clutch 92 and the shaft 46, yet the clutch 92 can slide along the axis of the shaft 46 between the front and rear gears 52, 54. The rear clutch 92 specifically includes internal splines within the bore that mate with corresponding external splines on the outer periphery of the outer propulsion shaft 46 to form the spline connection 118.

The rear clutch 92 also includes a counterbore 122. The counterbore 122 is sized to receive a pin 124 which extends through the rear aperture 88 of the inner propulsion shaft 44 and through the rear hole 98 of the plunger 94 when assembled. The ends of the pin 124 desirably are captured by an annular bushing 126 which is interposed between a pair of washers 128 and locked within the counterbore 122 of the dog clutch 92 by a retaining ring. The washers 128 journal the bushing and pin 124 assembly within the counterbore 122 of the rear dog clutch 92 to allow the bushing 126 and the pin 124 to rotate in an opposite direction from the rear clutch 92. The pin 124, being captured within the counterbore 122 of the rear clutch 92, couples the plunger 94 and the rear clutch 92 together in order for the plunger 94 to actuate the rear clutch 92, as discussed below.

A gap or clearance space desirably exists within the coupling between the front and rear clutches 90, 92. The clearance space desirably is at least as large as about 0.2 mm, but preferably is smaller than about 0.5 mm. In the illustrated embodiment, this clearance space principally occurs between the connecting pin 124 of the rear clutch 92 and the corresponding hole 98 formed in the plunger 94; however, a smaller clearance space can occur between the connecting pin 113 of the front clutch 90 and the hole 96 of the plunger 94. In an exemplary embodiment, the clearance space between the rear connecting pin 124 and the corresponding plunger hole 98 is at least as large as 0.2 mm, while the clearance space between the front connecting pin 113 and the corresponding plunger hole 96 is not significantly greater than 0.05 mm. In order to maintain a smooth shifting operation of the clutches 90, 92 in to and out of engagement with the gears 52, 54, the clearance between the rear connecting pin 124 and the corresponding plunger hole 98 desirably is not significantly greater than 0.5 mm.

The desired clearances can be formed by sizing the corresponding holes 96, 98 of the plunger 94 accordingly. Thus, for instance, the rear plunger hole 98 can be formed between 0.2 mm–0.5 mm larger than the diameter of the rear connecting pin 124. Similarly, the front plunger hole 96 can be formed to be no more than about 0.05 mm larger than the diameter of the front connecting pin 113. It is understood, however, that the desired clearance gap within the coupling between the front and rear clutches 90,92 can occur at other locations within the assembly.

With reference to FIGS. 2 and 3, the actuator mechanism 39 moves the plunger 94 of the clutch assembly from a position establishing a forward drive condition, in which the front and rear clutches 90, 92 engage the first and second gears 52, 54, respectively, to a position of non-engagement (i.e., the neutral position) and to a position establishing a reverse drive condition, in which the rear clutch 92 engages the front gear 52. The actuator mechanism 39 positively reciprocates the plunger 94 between these positions.

The actuator mechanism 39 includes a cam member 130 that connects the plunger 94 to a rotatable shift rod 132. In the illustrated embodiment, the shift rod 132 is journalled for rotation in the lower unit 28 and extends upwardly to the transmission operator. The actuator mechanism 39 converts rotational movement of the shift rod 132 into linear movement of the plunger 94 to move the plunger 94 and the clutches 90, 92 generally along the axis of the propulsion shafts 44, 46.

The cam member 130 is affixed to the lower end of the shift rod 132. The cam member 130 includes an eccentrically positioned drive pin 134 which extends downward from the cam member 128. The cam member 128 includes a cylindrical upper bearing 136 and a smaller diameter, cylindrical lower member 138. The upper bearing 136 is positioned to rotate about the axis of the shift rod 132 and as seen in FIG. 3, is suitably journalled within an upper bore of the lower unit 28. The lower member 138 is eccentrically positioned relative to the axis of the shift rod 132 and the upper bearing 136.

The follower 140 also includes an aperture 146 which, as best seen in FIG. 5, extends into the body 142 from the end from which the retention arm 144 depends, and, which, as best seen in FIG. 7, extends through the body 142 in a transverse direction. The aperture 146 has a width generally equal to the diameter of the drive pin 134 of the cam member 130. When assembled, as illustrated in FIG. 7, the drive pin 134 extends through the aperture 146 and is captured between the walls of the follower body 142.

As best understood from FIG. 3, the drive pin 134 has a width which generally equals the width of the rear annular groove 109 on the exterior of the front clutch 90. In this manner, the clutch groove 109 receives the drive pin 134 of the actuator mechanism 39.

The drive pin 134 moves both axially and transversely with rotation of the cam member 130 because of the eccentric position of the drive pin 134 relative to the rotational axis of the cam member 130. The axial travel of the drive pin 134 causes the follower 140 and the coupled clutch 90 to move axially, sliding over the inner propulsion shaft 52.

The front clutch 90 is coupled to the cam member 130 with the drive pin 134 cradled between the walls of the rear annular groove 109 on the front clutch 90. The actuator mechanism 39 configured accordingly positively moves the front clutch 90 along the axis of the inner propulsion shaft 44 with rotational movement of the cam member 130 operated by the shift rod 132. The coupling between the actuator mechanism 39 and front clutch 90, however, allows the clutch 90 to rotate with the inner propulsion shaft 44 relative to the drive pin 134 and the cam member 130.

Figures 5A, 5B, 5C:
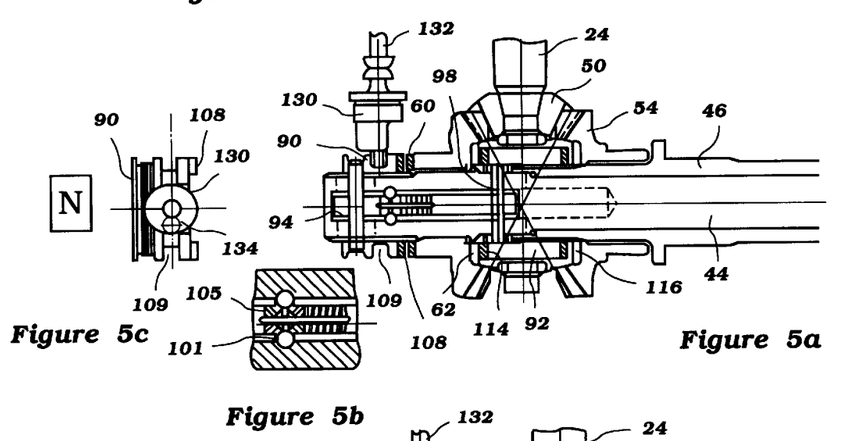
FIG. 5a is an isolated side view of transmission of FIG. 2 in a neutral position.
FIG. 5b is an enlarge view of a neutral detent mechanism used with the transmission and is illustrated in a position corresponding to the neutral position of the transmission.
FIG. 5c is a partial top plan view of a front clutch element and a shift actuator mechanism in a position corresponding to the neutral position of the transmission.

The following elaborates on the previous description of the operation of the present transmission 36. FIG. 5a through 5c illustrates the components of the transmission 36 and the shift actuator 39 in a neutral position, i.e., a position of non-engagement between the clutches 90, 92 and the gears 52, 54. The detent mechanism 99 retains the plunger 94 and the coupled clutches 90, 92 in this neutral position.

Figures 6A, 6B, 6C:
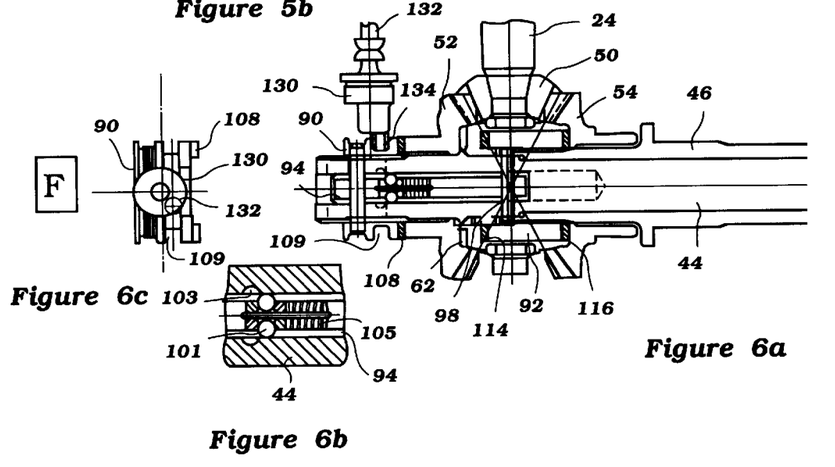
FIG. 6a is an elevational view of transmission of FIG. 4a in a forward drive position.
FIG. 6b is the neutral detent mechanism in a position corresponding to the forward drive position of the transmission.
FIG. 6c is a partial top plan view of the front clutch element and shift actuator mechanism in a position corresponding to the forward drive position of the transmission.

To establish a forward drive condition, as seen in FIGS. 6a Through 6c, the shift rod 132 rotates the cam member 130 in a manner which moves the drive pin 134 axially in the reverse direction. In the illustrated embodiment, counterclockwise rotation of the shift rod 132 moves the eccentric driving pin 134 axially in that direction to slide the front clutch 90 over the inner propulsion shaft 44. The actuator mechanism 39 thereby forces the front clutch 90 into engagement with the front gear 52, with the corresponding clutch teeth 60, 108 mating. So engaged, the front gear 52 drives the inner propulsion shaft 44 through the internal spline connection between the clutch 90 and the inner propulsion shaft 44. The inner propulsion shaft 44 thus drives the rear propeller 40 (FIG. 2) in a first direction which asserts a forward thrust.

The forward motion of the clutch 90 also causes the plunger 94 to slide within the longitudinal bore 84 of the inner propulsion shaft 44 in the rearward direction due to the direct coupling by the drive pin 113. The plunger 94 moves the rear drive pin 124 in the rearward direction to force the rear clutch 92 to engage the rear gear 54 with a corresponding clutching teeth 72, 116 mating. So engaged, the rear gear 54 drives the outer propulsion shaft 46 through the spline connection 118 between the rear clutch 92 and the outer propulsion shaft 46. The outer propulsion shaft 46 thus drives the front propeller 42 (FIG. 2) to spin in an opposite direction to that of the rear propeller 40, and to assert a forward thrust.

The relatively small degree of play within the coupling between the clutches 90, 92 is virtually unnoticeably when shifting. Any delay in transmission response is generally compensated by the inherent attraction between the gear 54 and the rear clutch 92 due to the shape of the corresponding teeth.

Figures 7A, 7B, 7C:
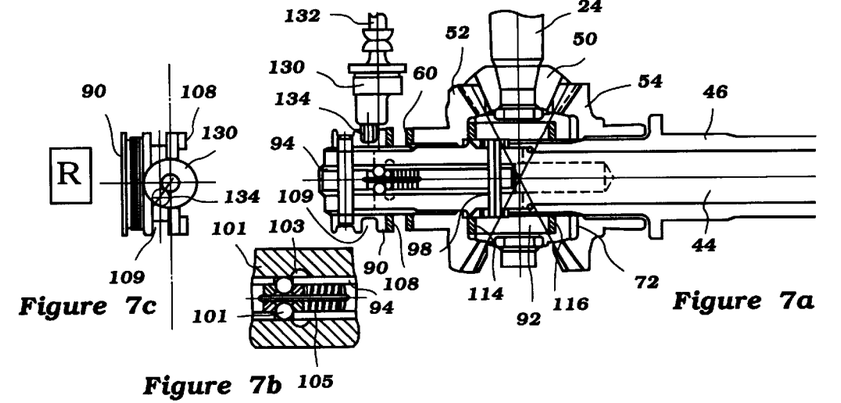
FIG. 7a is an elevational view of transmission of FIG. 4a in a reverse drive position.
FIG. 7b is the neutral detent mechanism in a position corresponding to the reverse drive position of the transmission.
FIG. 7c is a partial top plan view of the front clutch element and shift actuator mechanism in a position corresponding to the reverse drive position of the transmission.

With reference to FIGS. 7a through 7c, to establish a reverse drive condition, the shift rod 132 rotates in an opposite direction so as to move the cam member 130 and the eccentrically positioned drive pin 134 in a direction which moves the drive pin 134 axially in the forward direction. Again, in the illustrated embodiment, clockwise rotation of the shift rod 134 eccentrically rotates the drive pin 134 so as to move the drive pin axially in the forward direction. The forward movement of the drive pin 134 is transferred to the plunger 94 through the clutch 90 and the corresponding drive pin 113. The forward motion of the plunger 94 positively forces the rear clutch 92 into engagement with the front gear 52 with the corresponding clutching teeth 62, 114, mating. So engaged, the front gear 52 drives the outer propulsion shaft 44 through the spline connection 118 between the rear clutch 92 and the outer propulsion shaft 44. Again, the inherent attraction between the gear 54 and the rear clutch 92, which is due to the shape of the corresponding teeth, generally compensates for any delay in transmission response due to the play in the coupling between the clutches 90, 92. The outer propulsion shaft 44 thus drives the front propeller 42 (FIG. 2) in a direction which asserts a reverse thrust to propel the watercraft 14 (FIG. 1) in reverse.

The gap formed within the clutch coupling tends to compensate for tolerance stack-ups in the assembled transmission. As a result, the annular bushing 126 of the coupling between the rear clutch 92 and the plunger 94 is not forced against one of the washers 128 when the clutch engages either of the gears 52, 54. Less friction thus occurs within this coupling (i.e., between the annular bushing 126 and the washers 128 or the clutch 92 itself), and the wear life of these components is greatly improved.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A transmission for a marine drive comprising a first driven gear and a corresponding first clutch element coupled to a first propulsion shaft, a shift operator coupled to the first clutch element by a coupling, the coupling including an annular bushing journalled for rotation within a bore of the first clutch element and a pin which links the shift operator to the annular bushing, the pin being arranged within the transmission such that a clearance space exists between the pin and the shift operator.

2. A transmission as in claim 1, wherein the clearance space is not less than 0.2 mm between the pin and the shift operator.

3. A transmission as in claim 2, wherein the clearance between the pin and the shift operator is not greater than 0.5 mm.

4. A transmission as in claim 1, wherein the pin extends at least into a hole formed within the shift operator, and the hole has a diameter of at least 0.2 mm larger than a diameter of the pin to define the clearance space.

5. A transmission as in claim 4, wherein the hole diameter is not larger than 0.5 mm larger than the pin diameter.

6. A transmission as in claim 1, wherein a locking ring retains the annular bushing within the bore with the annular bushing interposed between a pair of washers.

7. A transmission as in claim 1, wherein the shift operator comprises a cylindrical rod that slides along a rotational axis of the first propulsion shaft.

8. A transmission as in claim 1, wherein a spline connection couples the first clutch element to the first propulsion shaft, and the first clutch element includes teeth which cooperate with teeth formed on a surface of the first driven gear, the first clutch teeth being formed to draw the first clutch element toward the first gear upon initiation of engagement between the corresponding first gear teeth.

9. A transmission as in claim 1 additionally comprising a second driven gear positioned to oppose the first driven gear with the first clutch element positioned between the gears.

10. A transmission as in claim 1, wherein the pin extends through a hole formed in the shift operator, and the hole has a sufficiently large diameter in relation to a diameter of the pin such that the pin floats freely within the hole, with the clearance space occurring between the pin and an inner surface of the hole.

11. A transmission as in claim 1, wherein the pin extends at least into a hole formed within the shift operator, and the hole has a diameter larger than a diameter of the pin to define the clearance space, the interaction between the pin and the hole forming the only coupling between the pin and the shift operator.

12. A transmission for a marine drive comprising first and second counter-rotating gears, a first clutch element coupled to a first propulsion shaft and adapted to selectively engage either of the first and second gears to establish at least a first or a second drive condition, and a second clutch element coupled to a second propulsion shaft, the second clutch element adapted to selectively engage the second gear under one of the drive conditions, a shift operator coupling together the clutch elements to engage and disengage the clutch elements from the first and second gears, and at least a first clearance gap formed in an assembly of the shift operator and the clutch elements.

13. A transmission as in claim 12 additionally comprising a first coupling including an inner member that is retained within the first clutch element and supported to rotate relative to the first clutch element, and a first link which interconnects the inner member to the shift operator, and a second coupling including a second link that interconnects the shift operator and the second clutch element, the first link interacting with the shift operator to form the first clearance gap between the first link and the shift operator, and the second link interacting with the shift operator to form a second clearance gap between the second link and the shift operator.

14. A transmission as in claim 13, wherein the first clearance gap between the first link and the shift operator is greater than the second clearance gap between the second link and the shift operator.

15. A transmission as in claim 13, wherein the second clearance gap is greater than the first clearance gap.

16. A transmission as in claim 13, wherein the first clearance gap between the first link and the shift operator is not less than about 0.2 mm.

17. A transmission as in claim 16, wherein the first clearance gap betwen the first link and the shift operator is not greater than about 0.5 mm.

18. A transmission as in claim 17, wherein the second clearance gap between the second link and the shift operator is no more than about 0.05 mm.

19. A transmission as in claim 16, wherein the first clutch element includes a plurality of teeth on each side of the clutch element, and the teeth are configured to cooperate with corresponding teeth carried by the first and second gears, and the corresponding teeth on the first clutch element and the driven gears are configured to draw the first clutch element toward the respective driven gear upon initiation of engagement between the corresponding teeth.

20. A transmission as in claim 13, wherein the inner member is an annular ring.

21. A transmission as in claim 20, wherein a locking ring retains the annular ring within a bore of the first clutch element with the annular ring interposed between a pair of washers.

22. A transmission as in claim 21, wherein the link is a pin that extends through a portion of the shift operator with its ends captured within the annular ring.

23. A transmission as in claim 22, wherein the shift operator comprises a cylindrical rod having a transverse hole through which the pin extends to interconnect the shift operator to the annular ring, and the transverse hole is sized to form not more than 0.2 mm of clearance between the pin and the edges of the hole.

24. A transmission as in claim 23, wherein the hole is round and the pin has a circular cross-sectional shape.

25. A transmission as in claim 12, wherein the first and second propulsion shafts extend to one side of the pair of driven gears about a common axis, and the second clutch element lies on an opposite side of the pair of driven gears.

* * * * *